United States Patent [19]

Bracht et al.

[11] Patent Number: 4,599,717
[45] Date of Patent: Jul. 8, 1986

[54] DIRECT READ AFTER WRITE VERIFY USING DIFFERENTIAL DETECTION

[75] Inventors: Rodger R. Bracht; Johannes J. Verboom, both of Colorado Springs, Colo.

[73] Assignee: Optical Storage International - U.S., New York, N.Y.

[21] Appl. No.: 578,148

[22] Filed: Feb. 8, 1984

[51] Int. Cl.⁴ .............................................. G11B 7/00
[52] U.S. Cl. ...................................... 369/54; 369/59; 360/53
[58] Field of Search ....................... 369/32, 53, 54, 59, 369/107, 109, 121; 360/53; 365/200, 215

[56] References Cited

U.S. PATENT DOCUMENTS 4,145,758 3/1979 Drexler et al. ................... 365/215 X
4,198,701 4/1980 Reddersen et al. .............. 360/102 X Primary Examiner—Robert L. Richardson
Attorney, Agent, or Firm—E. P. Heller, III; J. A. Genovese

[57] ABSTRACT

Disclosed is an apparatus for verifying data written on an optical disk by simultaneously reading the data during writing and using differential detection to verify that the data has been written correctly. The data is written in a fixed-block format defining a symbol having a predetermined number of symbol positions and a predetermined number of holes which may be written in the symbol positions, an equal number of holes in the odd positions and in the even positions. In this regard, the holes written in the odd positions are independently verified from the holes written in the even positions. Immediately after the laser has been operated at write power, it is returned to read power and a signal associated with the hole associated power of the reflected beam is sampled. This signal is compared to the signal power generated at the previous even or odd position. The highest signal is retained and compared to the next even or odd position's signal. At the end of the symbol, the location of the even and odd symbol positions having the highest signal power is determined and compared to the location of the write pulse to determine whether the location of the hole corresponds with the location of the write pulse.

15 Claims, 30 Drawing Figures

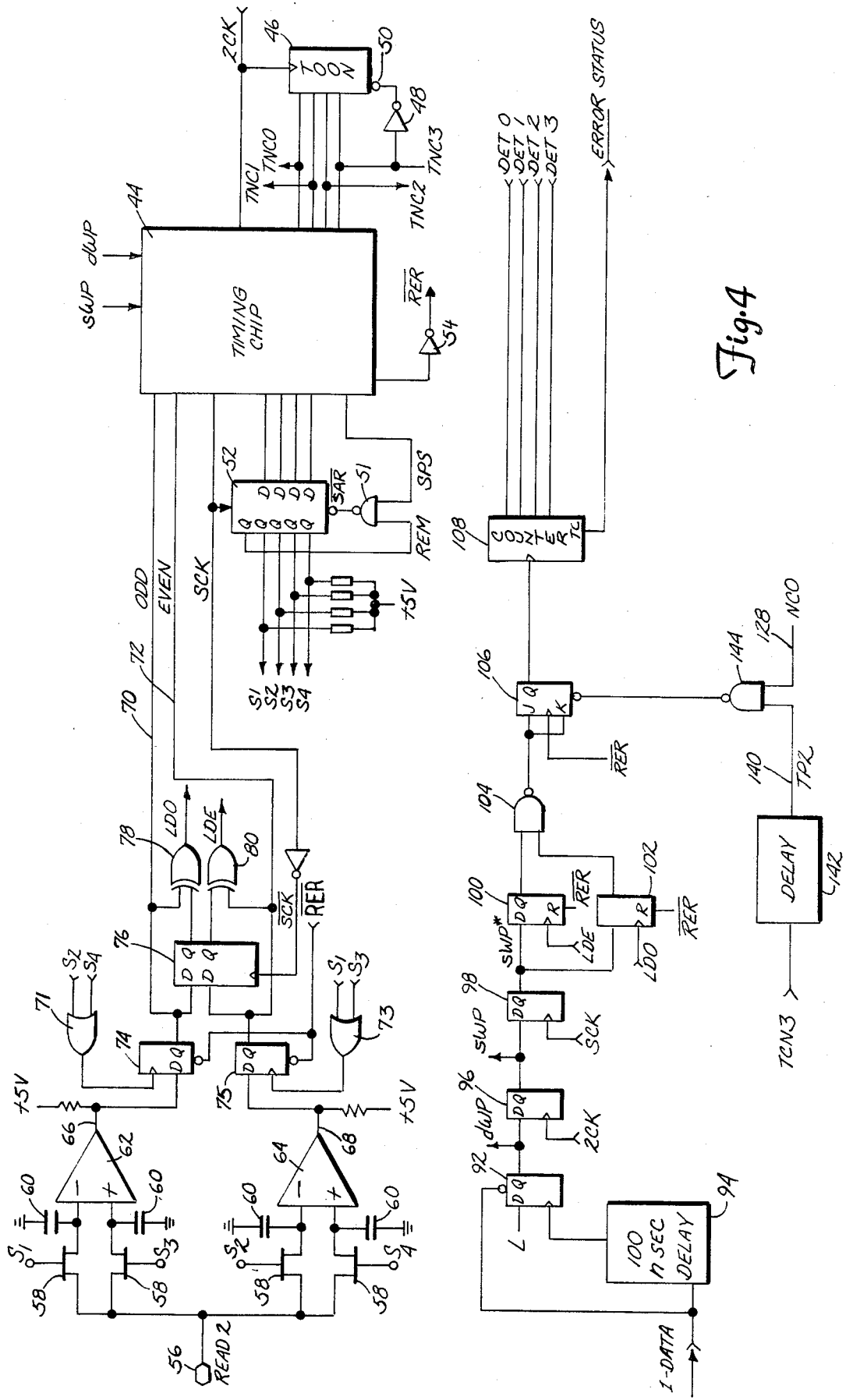

DIRECT READ AFTER WRITE VERIFY USING DIFFERENTIAL DETECTION

BACKGROUND OF THE INVENTION

1. Field of the Invention

The invention relates to the field of optical disk recorders and, more particularly, to means for verifying the proper writing of data on the optical disk.

2. Brief Description of the Prior Art

Prior read after write verify systems have used comparators to compare the read signal immediately after a hole has been written with a predetermined reference value. This reference level is a so-called predetermined threshold value. See, e.g., Miyauchi et al, U.S. Pat. No. 4,308,612; issued Dec. 29, 1981; filed Dec. 20, 1979; at col. 4, lines 28-33 and lines 48-52. For a practical optical recording systems, this method may not be entirely satisfactory due to the fact that the hole associated signal power may spread far beyond the location of the hole. It may be present at significant levels several positions away, at a point at which the sampling for a subsequent hole may be taking place. By positions we mean symbol positions in a fixed-block symbol. In writing holes on an optical disk without using a fixed-block symbol, positions may be considered to be the minimum spacing between holes. When the hole associated power from one hole is present to a significant extent at a subsequent sampling point for a subsequent hole, comparing hole associated power against an absolute predetermined threshold may inadvertently indicate the correct writing of the subsequent hole when, in fact, no such hole was written.

In addition, setting such a threshold may not be practicable in light of the many variations in optical system parameters that must be taken into account, including variations in disk reflectivity both from disk to disk and across a given disk, variations in laser power, optical efficiency, sense diode coupling error and circuit tolerances. Using a threshold in this environment will degrade signal to noise ratio margins.

SUMMARY OF THE INVENTION

The invention overcomes the above problem by differential detection of the hole associated power throughout an entire symbol and comparing the hole associated power at each symbol position with the hole associated power at the other symbol positions. In a fixed-block code such as the TOON code where only two out of the nine positions may have holes with one hole in an odd position and one hole in an even position, the comparison system compares the odd positions as a group and compares the even positions as a group. The signal from the ninth position, in which the code is constrained to never have a hole recorded, is used as a reference for both the even and odd groups. The hole associated power of the reflected read laser beam at each of the odd positions is compared first to the reference and then to the previous highest sampled value. The same is done for the even positions. Using this method, the location of the holes having the highest signal values is determined.

The results of the comparison are compared to the actual location of the write pulse and the results of this comparison are used to indicate or verify that the holes have been written in their proper positions.

BRIEF DESCRIPTION OF THE DRAWINGS

FIG. 4 shows a schematic of the present invention showing the apparatus which detects by comparison the location of the odd and the even symbol positions having the highest hole associated signal levels and which compares the locations of the write pulse signals with the locations of the detected holes.

FIGS. 6-1 and 6-2 show apparatus for write verifying the 4/15 code.

DESCRIPTION OF THE PREFERRED EMBODIMENT

An optical recorder reading the information from an optical disk does so conventionally by means of a laser operated at read power. The beam reflects from the disk, and the drop in reflection normally indicates the presence of a hole. Because reflected spot density distributions have a Gaussian shape, the hole associated power of the reflected beam (the hole associated power means the inverse of the reflected power from the disk) spreads a significant distance beyond the boundaries of the holes themselves. Indeed, the hole power present at the center of the next possible position of a hole in closely spaced systems may be significant. Therefore, one cannot rely on threshold detectors to detect the presence of a hole, because the threshold may be reached due to a hole at an earlier or later position, or a combination of the two. For this reason, it is desirable to use differential detection to detect the location of the holes within the symbol.

Figure 1:
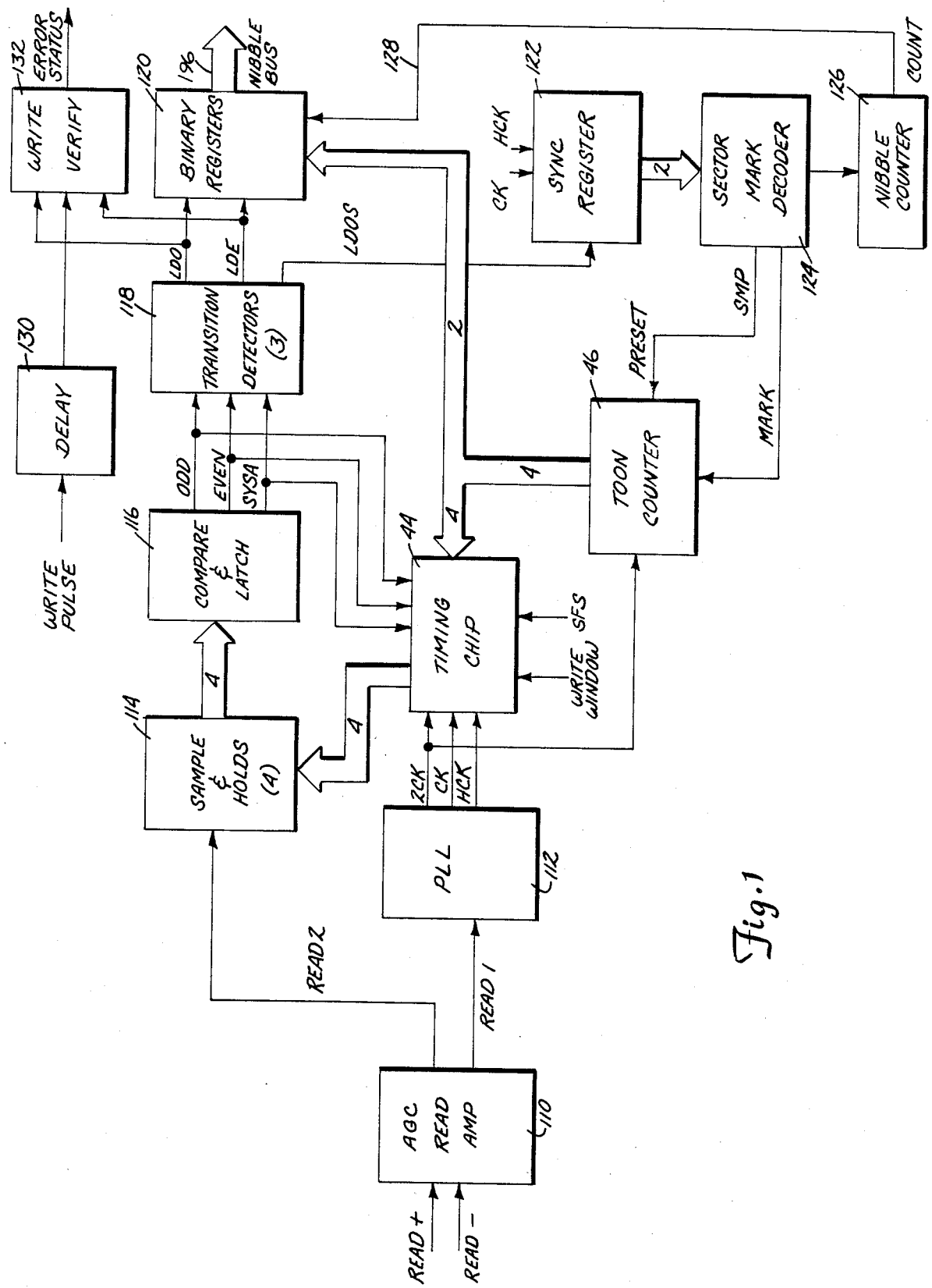
FIG. 1 shows a block diagram of the read channel of the optical recording system of the preferred embodiment.

FIG. 1 shows a block diagram of the read channel of the optical recording system according to the present invention. The pre-amplified signal from the read detector (not shown) is input to the AGC 110 shown in FIG. 1, which outputs the amplified and limited signal on Read 1 and Read 2 outputs. The Read 1 output is input to a phase lock loop 112 which tracks a prerecorded clock inscribed in the optical disk, or if the code is self-clocking, the clock information present in the code. The phase lock loop outputs several clock signals, the most important of which is a 2CK clock at a frequency twice that of the prerecorded clock. This 2CK is input to a Timing Chip 44 and to a TOON counter 46. TOON is the name of the fixed block code of the preferred embodiment. It essential purpose is to count the number of symbol positions to generate a symbol position address. The function of the Timing Chip 44 will be discussed infra.

The Read 2 signal is input to four gated sample and hold cells 114, two each for the respective even and odd symbol positions of the TOON code. The sampling of the cells is controlled by Timing Chip 44. The outputs of the cells are input to two comparators 116, and even and an odd comparator respectively, which determine which of the two has the highest hole associated signal power. The comparator outputs are first latched and then fed back to Timing Chip 44 and to a transition detector circuit 118. The transition detectors detect a change in the state of the comparators 116 outputs and signal that change to a pair of nibble registers 120, one for the even and one for the odd symbol positions. The address of the change as represented by the count on the TOON Counter 46 is recorded by binary registers 120 and becomes the binary value of the symbol. After two symbols have been recorded in the registers 120, the optical disk recorder reads the eight binary bits of data out of the registers along a data bus.

The system also detects the presence of sector marks and this information is supplied to a sync register 122 which decodes the location of the sector mark 124 and initializes TOON counter 46 and a nibble counter 126, which continues to count up by one each symbol until the next sector mark. The lowest order bit of this nibble counter, nibble count 0, is output on output 128 and is used by the binary registers 120 to decode two symbols into eight binary bits, one byte, of data to be output on bus 196.

The present invention pertains an optical recording systems writing data on the optical disk in fixed-block format wherein binary data is encoded into a symbol having a predetermined number of positions in which a predetermined number of holes are recorded. The preferred embodiment uses a so-called TOON code which has eight positions in which holes may be written and one position in which no holes are written. The latter position is normally reserved at the end of the symbol. The TOON code is further constrained to have one hole written at an even position and one hole written at an odd position. Only two holes are written in the symbol.

Figure 2:
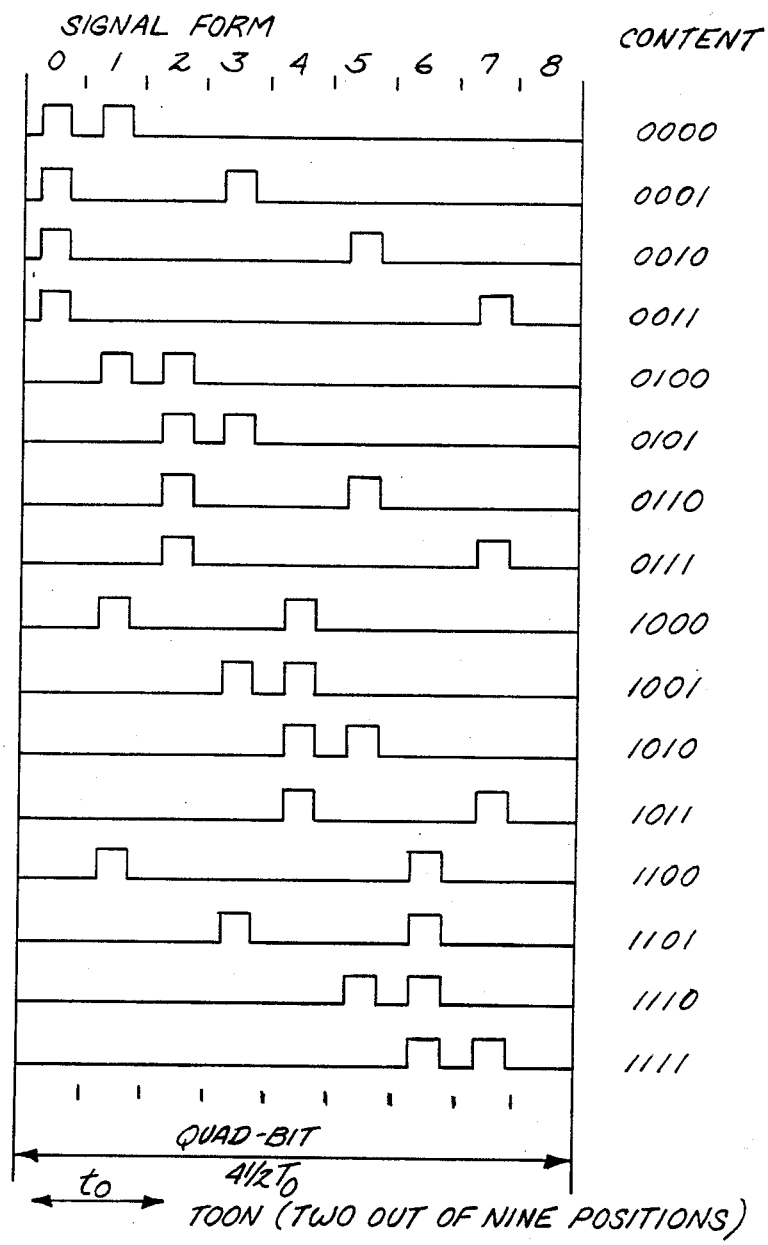
FIG. 2 shows the TOON code and it corresponding binary equivalent.

FIG. 2 shows the TOON code. It has nine positions numbered in the Figure from zero to eight. The eighth position is the one constrained to never have a hole recorded in it. The other eight positions have one hole in an even position and one hole in an odd position. The code is shown in the Figure and the corresponding binary bit values are shown in the table to the right. Each symbol of the TOON code encodes four bits of information.

Figure 3:
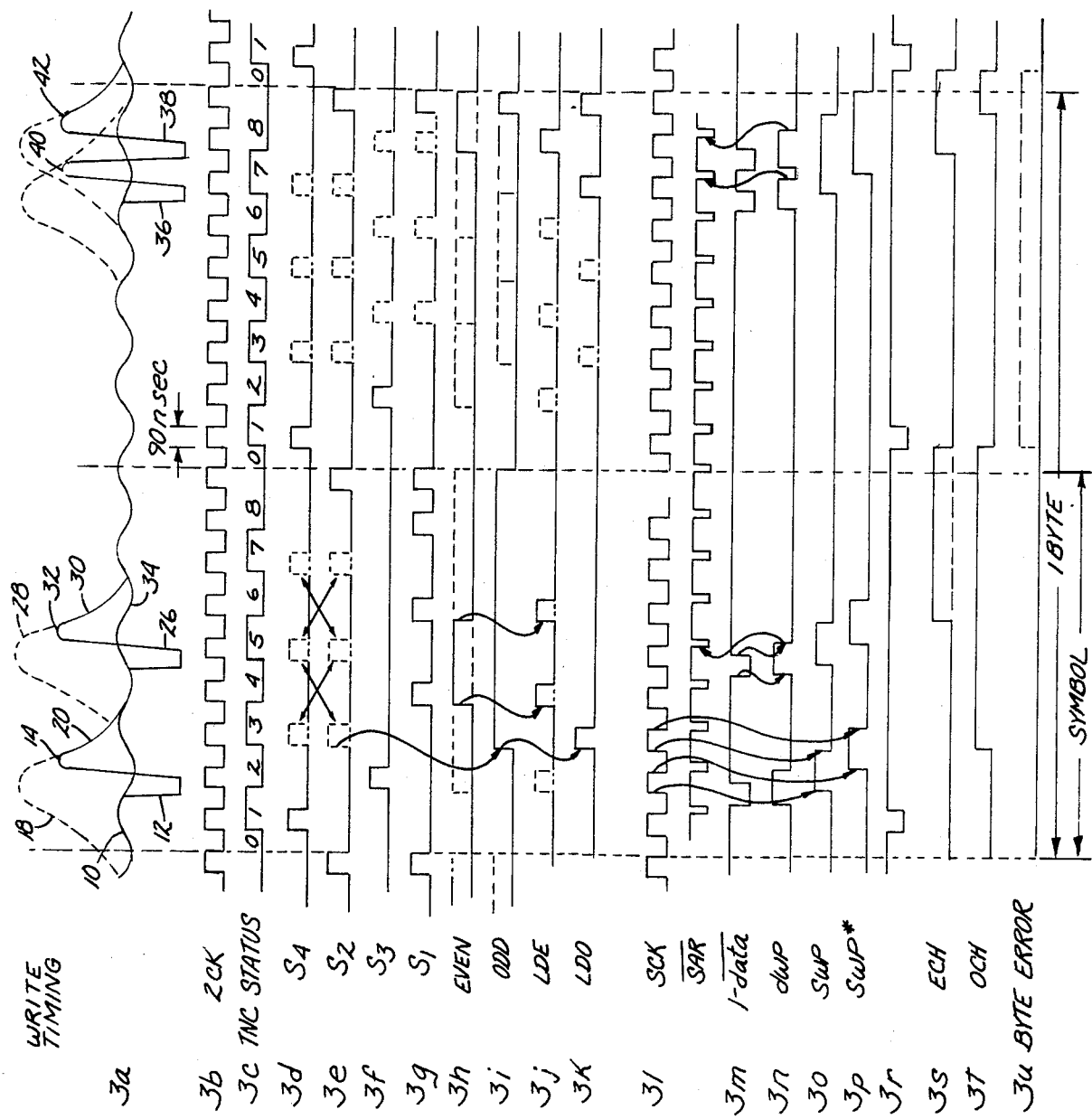
FIGS. 3a-3p and 3s-3u show a timing diagram of various signals and pulses of the apparatus of the present invention over two symbols and showing the signal levels associated with two possible hole patterns.

The code is recorded on the media in such a manner that four and one-half clock periods, $T_o$, span the symbol. Referring to FIG. 3a, the clock is illustrated as the sinusoidal line 10. It is from this signal that the phase lock loop generates the 2CK signal shown in FIG. 3b.

The fall of 2CK denotes the beginning of a symbol position and the rise of 2CK denotes the center of a symbol position. There are exactly nine 2CK clocks in a symbol. In the preferred embodiment, the phase lock loop adjusts the phase of 2CK such that the signal SCK, discussed infra, which is derived from 2CK but delayed therefrom by a matter of 20 to 30 nanoseconds, is in phase with the prerecorded clock such that SCK's positive transitions occur at the center of a symbol position. With this in mind, further discussion of symbol positions will be in reference to 2CK.

FIG. 3c corresponds to the TNC0 bit out of the TOON Counter 46. It undergoes eight transitions during a symbol and the transitions occur at the center of a given symbol position. The numbers in the Figure correspond to the number of the symbol position in which the next transition occurs. There is no transition in ninth symbol position, number 8, primarily because no hole will ever be recognized in this position even if a hole is somehow recorded therein.

Holes are preferably written at the center of a symbol position. To write a hole, the optical recording device generates a write pulse from a laser beam of approximately 60 nanoseconds in length. The symbol position length or the length of time for a symbol position to pass past a fixed location at typical operating speeds of the optical recording system of the preferred embodiment is 180 nanoseconds. The hole burned into the optical recording medium by such a write pulse is typically much larger than 60 nanoseconds in length and may be larger than the 180 nanoseconds length of a symbol position. After the laser beam has been pulsed at write power the optical recording system of the preferred embodiment returns it to a read power level used conventionally to read the prerecorded clock on the optical recording surface. The laser beam continues to be focused for a short period of time on the hole just burned in the optical recording medium. The loss of reflectivity caused by the hole can be detected by the read detectors employed in the read apparatus of a conventional optical disk recorder system.

FIG. 3a shows the inverse of the power of the reflected laser beam for two typical symbols on the optical recording medium. The absence of reflection caused by the presence of a hole is shown as a positive signal, while the presence of reflection due to a write pulse is indicated by a negative signal. The vertical dashed lines in the Figure represent the boundaries at the edges of the symbols.

Again referring to FIG. 3a, the optical recording apparatus is shown writing a hole at the center of symbol positions numbers 1 and 4 of the first symbol. In this regard, the write pulse occurs 30 nanoseconds before the rising edge of the 2CK and is designed to reach its peak power precisely at the occurrence of the rising edge of the 2CK at the center of symbol position number 1. 30 nanoseconds later the write pulse is turned off. The write pulse in the Figure is denoted by the negative going waveform 12 and also by the 1-data NOT signal at FIG. 3m.

After the write pulse has been terminated and the laser beam restored to its "read" power the laser beam will remain over a portion of the hole just formed in the optical recording medium, assuming, of course, a hole was in fact formed by the write pulse. In this regard, the hole does not reflect the laser beam and the inverse of the signal detected by apparatus detecting the reflected beam will generate a high signal at 14 in the Figure. The solid line 20 in the Figure represents the actual signal, corresponding to the hole associated signal power. During a normal read where the apparatus reads the hole from edge to edge, the hole associated signal would appear as in the dotted line 18 and would peak at a peak 16 which is of greater amplitude than peak 14 of the read after write signal 20. As can be seen by inspection of the Figure, the hole associated power 20 of a hole written at symbol position 1 will be present to a significant degree at symbol position 2.

The second negative going pulse in FIG. 3a represents a second hole being written in the symbol at the center of symbol position 4. Here again, the dotted line 28 represents the hole associated signal power which would have been received by the read system were it to detect the hole under normal reading conditions. However, as the laser beam detects the hole at least 30 nanoseconds after the center of the hole has passed, the signal strength is again detected at a peak 32 somewhat less than it would have been under normal read conditions.

Assuming a defect in the media or perhaps a defect in the writing system, a hole may not formed in the media. When the write pulse is turned off, the hole associated power of the read signal will then not follow line 30 but will instead follow the line 34 which corresponds to the signal of the prerecorded clock.

The second symbol shows holes 40, 42 being written by write pulses 36 and 38 at symbol positions 6 and 7.

FIG. 4 shows apparatus first for detection of the location of a hole and secondly for comparing the location of the detected hole with the actual location of the write pulse.

Referring to the top right-most part of FIG. 4, the 2CK clock derived from the phase lock loop 112 is provided as an input to both a Timing Chip 44 and a TOON counter 46. TOON counter 46 counts once for each cycle of the 2CK with its four-bit count on outputs TNC0, TNC1, TNC2, and TNC3, respectively. A count of 8, TNC3, resets the counter to zero due to the inverter 48 feeding TNC3 back into master reset not 50 of the TOON counter 46.

The Timing Chip 44 also outputs an RER signal, which is inverted by inverter 54, to become an RER NOT signal. The signal RER is output once per symbol during the last half period of symbol position 0. The purpose of RER is to signal the end of a symbol to various registers as will be discussed infra, and also to reset other registers.

Figure 5:
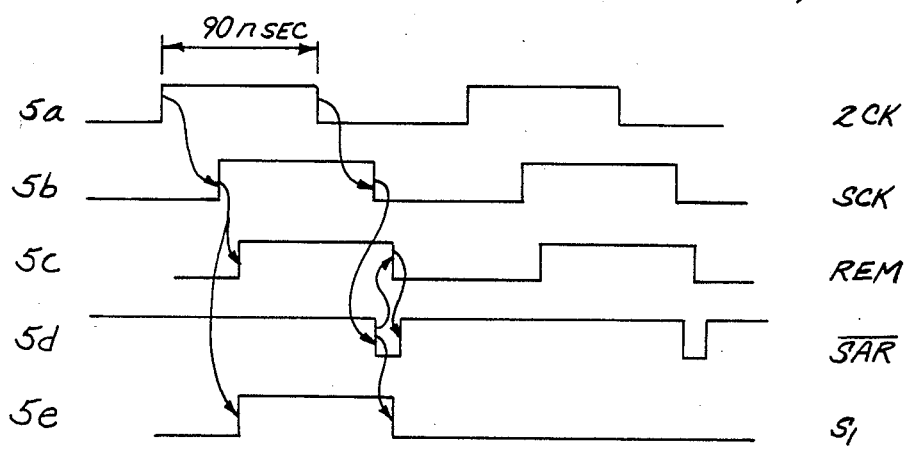
FIGS. 5a-5e the relative time spacing between a number of clocks and other symbols employed by the preferred apparatus.

As can be seen from FIG. 3l, the Timing Chip outputs and S-clock ("SCK") which corresponds directly with the 2CK signal. SCK is delayed from 2CK by approximately 22.5 nanoseconds as can be seen from FIG. 5.

The Timing Chip 44 also outputs through register 52 signals S1, S2, S3 and S4 and an REM signal. Signals S1–S4 and REM are set by the rising edge of SCK clocking register 52. Signal SAR NOT resets register 52 and signals S1 through S4 and REM. SAR NOT is normally triggered at the falling edge of SCK, see FIG. 5 where it can be seen that at the fall of the SCK signal, which occurs 22.5 nanoseconds after the fall of the 2CK signal, causes the Timing Chip 44 to output an SPS signal, which when coupled with REM in NAND gate 51, generates the SAR NOT signal (see FIG. 5d) which resets register 52 and thereby resets signal S1 through S4 and REM as can be seen from FIG. 5e, which shows the resetting of the S1 signal. The resetting of REM also resets SAR NOT. Thus, the S1 signal is normally "on" for a period of approximately 90 nanoseconds from a point approximately 30 nanoseconds after the rise of the 2CK signal to approximately 30 nanoseconds after its fall.

Referring to the upper left-most of FIG. 4, the signals S1 to S4 control corresponding FET gates 58 between the Read 2 input 56 and respective grounded capacitors 60. The combination of a gate and a capacitor forms a sample and hold cell as is known to the art, and the respective sample and hold cells will henceforth be referred by the respective signals controlling their gates, S1, S2, S3 and S4. The signal input on Read 2 line 56 corresponds to the hole associated power of the reflected laser beam as discussed above. Each of the capacitors 60 is also connected two each to respective comparators 62 and 64. Comparator 62 operates on the even positions of a TOON symbol and comparator 64 operates on the odd positions. Comparator 62 compares the signal value on the S1 sample hold with the signal value then present on the S3 sample and hold, while the comparator 64 compares the signal value in the S2 sample hold with signal value on the S4 sample and hold. The comparators output the results of the comparison on outputs 66 and 68, respectively. These outputs are latched by flip flops 74 and 75, the outputs of which are provided as respective inputs 70 and 72 to the Timing Chip 44.

The write beam is synchronized to write for 60 nanoseconds centered on the rise of 2CK, the center of a symbol position. S1 through S4 go high about 30 nanoseconds after the rise of 2CK, just about the time the write beam extinguishes. When a write pulse has just occurred, Timing Chip 44 synchronizes the issuance of the SAR NOT signal to the write pulse by responding to the sWP and dWP signals. These two signals, sWP and dWP, are the outputs of registers 96 and 98, which will be discussed in more detail infra, but their function is essentially to generate a delay signal responsive to the write pulse. The purpose of this delay is to delay the turning off of the signals S1 through S4 until the peak of the hole associated signal is sampled. This generally occurs a measureable time after the occurrence of the write pulse, and will be a predetermined time. Signals sWP and dWP are provided as inputs to Timing Chip 44. Their timing in relation to a write pulse are shown in FIGS. 3m through 3o. The write pulse corresponds to the 1-data NOT pulse, FIG. 3m.

Referring again to FIG. 4, the Timing Chip 44 initially turns S1 and S2 on during the last half-period of symbol position 8 of every symbol position, see FIGS. 3e and 3f. Because symbol position 8 is the symbol position in which no hole is ever written, this sampling is intended to initialize these sample and hold cells to a reference value. An alternative method of initialization would be to include circuitry to initialize these sample and holds from a fixed reference equivalent to the signal strength of the no-hole condition.

During the first symbol position of the immediately following symbol, symbol position 0, and even position, sample and hold cell S4 is turned on to sample the signal at the first even cell. During the first odd position, position number 1, sample and hold S3 is turned on to sample the signal at the first odd cell. The signals present on the Read 2 line 56 during these symbol positions are copied into the corresponding capacitors 60 of the sample and hold cells and compared with the signal in the S1 and S2 sample and hold cells, which contain the reference level. If for example, the results of the comparison indicate that S1 sample and hold value exceeds the S3 sample and hold value, the output 66 of the comparator 62 will be low. Output 68 will be low if S2 exceeds S4. The Timing Chip 44 then saves the higher of the two values, S1 (S2). It does this at the next occurrence of an odd (or even) cell by triggering the S3 (S4) sample and hold, which then holds the lowest valued signal of the two. If again the S1 (S2) sample and hold contains the highest value, at the next occurrence of an odd (even) symbol position, the S3 (S4) sample and hold is again triggered. This process continues throughout the symbol with the highest value sample and hold cell retained and compared with the next sampled value. At the end of the symbol, one of the sample and holds of each comparator will contain the highest valued signal, and this signal corresponds to the hole within the symbol, if there is a hole recorded there.

Referring to the example shown in FIG. 3a, when the S3 sample and hold cell is triggered at position 1 in the first symbol, it samples the signal caused by the hole just written. The sample and hold samples a read signal at approximately the level indicated at point 14 on FIG. 3a. As can be seen by inspection of FIG. 3a, the signal level at this point 14 is higher than the signal sampled by the S1 sample and hold at the previous symbol position 8. The signal in the S3 sample and hold is higher than the signal on the S1 sample and hold and is retained. At the next occurrence of an odd symbol at symbol position 5, the Timing Chip 44 determines that S3 now contains the highest signal and triggers the S1 sample and hold. By inspection of FIG. 3a, it can be seen that the signal level at this point 30 is higher than the reference signal level but lower than the peak value 14 of the signal at position 1. Thus, S3 continues to contain the higher of the two values. Timing Chip 44 triggers S1 at the last odd position, position number 7. This value is again less than the value in sample and hold cell S3. (The sequence of triggering of S1 and S3 just described is shown at FIGS. 3f and 3g.)

If at any time the two signal levels present in the respective sample and holds are about equal, which may occur when the holes are recorded later in the symbol, the state of the comparators 62 or 64 is indeterminate. Either one of the two is retained for the next symbol. This feature is illustrated by the dashed lines shown in FIGS. 3d and 3e which show the triggering of the S2 and S4 sample and hold cells.

Timing Chip 44 recognizes the finding of a new higher valued signal by the change in the outputs of the latched comparators 62 or 64, which are connected to Timing Chip 44 via flip flops 74 and 75 on lines 70 and 72. FIGS. 3h and 3i, which show the state of the outputs of the even and odd flip flops 74 and 75, respectively.

The outputs of the comparators 62 and 64 are provided as inputs to respective flip flops 74 and 75, whose outputs are in turn provided to register 76 and as one input to exclusive-OR gates 78 and 80. The outputs of register 76 are provided as the other inputs to exclusive-OR gates 78 and 80. Flip flops 74 and 75 are clocked by OR gates 71 and 73 respectively, which form the logical OR of the signals S2 and S4, and S1 and S3 respectively. This method of clocking these flip flops assures that the outputs of the comparators are sampled after the comparators have changed by sampling an even position at the next odd position and an odd position at the next even position. Further the state of the flip flops remains steady for a predetermined clock period. Register 76 is clocked by the inversion of SCK approximately 90 nanoseconds after the clocking of flip flops 74. The exclusive-OR gates 78 and 80 compare the outputs of the comparator 62 and 64 from one symbol position to another and generate a pulse of approximately 90 nanoseconds duration if the outputs change. Exclusive-OR gate 78 is indirectly connected to the output 66 of comparator 62. FIG. 3j shows the pulse LDO out of exclusive-OR gate 78 indicative of the changes in the relative signal levels in the S1 and S3 sample and holds discussed heretofore. Exclusive OR gate 80 is indirectly connected to the output 68 of the comparator 64. FIG. 3k shows the pulse out of exclusive-OR gate 80 indicative of the changes in the relative signal level of sample and hold cells S2 and S4 discussed above. The load odd and load even pulses LDO and LDE occur when a new "higher" signal level has been recognized by the respective comparators.

A 1-data NOT signal which the optical recording system uses to issue a write pulse is provided as an input to the SET NOT input of a flip flop 92 and also to variable delay circuit 94. The delay of the circuit 94 is adjustable to a maximum delay of 100 nanoseconds so that the circuits of the preferred embodiment can be fine tuned to a particular machine. The delay not only adjusts the setting of the turn-off time of S1 through S4, but also the timing in relation to the LDO and LDE pulses. An 1-data NOT pulse sets flip flop 92 and a pulse from the 100 nanosecond variable delay circuit 94 resets the flip flop 92 as the D input is latched low. The output of this flip flop is the dWP signal shown in FIG. 3n and is provided both to Timing Chip 44 and to a flip flop 96. Flip flop 96 is clocked by the 2CK signal so that the rising edge of 2CK sets the flip flop and the next rising edge resets it. The output of this flip flop 96 is the sWP signal shown in FIG. 2o and is provided to both Timing Chip 44 and to a flip flop 98. Flip flop 98 is clocked by the inverted SCK clock such that the fall of SCK set the flip flop and the next fall resets. The signal out of this flip flop is the sWP* signal shown at FIG. 3p. From inspection of the Figure, it can be seen that sWP* is delayed about 120 nanoseconds from sWP. The output of this flip flop 98 is provided as an input to flip flops 100 and 102. These are clocked respectively by the LDE signal and the LDO signal. The delays of the 100 nanosecond delay 94 and flip flops 96 and 98 delay the write pulse from reaching flip flops 100 and 102 until a time corresponding to the "90" nanosecond sampling time of S1 through S4 signals, the delays through the comparator 62, delays through the flip flops 74 and 75 and register 76, and the delays through exclusive OR gates 78 and 80.

If a hole has been properly written onto the optical recording surface, a write pulse will be present at the D input to flip flop 100 at the occurrence of the last load even and load odd pulses, LDE and LDO respectively. If, and only if, there is a correspondence between the last occurrence of an LDE signal and an LDO signal and respective write pulses in the even and odd positions will the outputs of the flip flops 100 and 102 be simultaneously at a logical one state. The output of flip flop 100 is shown at FIG. 3s and the output of flip flop 102 is show at FIG. 3t. If the second write pulse of the first symbol did not write a pulse correctly or if a media defect caused a high level at another even position, flip flop 100 will remain off and this is shown in FIG. 3s by the dashed lines. This same analysis pertains to LDO and flip flop 102.

The outputs of these flip flops 100 and 102 are input to a NAND gate 104. The output of NAND gate 104 is low if, and only if, flip flops 100 and 102 have recorded the simultaneous occurrence of write pulses and load even and load odd signals.

A nibble count 0 (128) issued by the nibble counter 126 and a tp2 pulse 140, which comprises a delayed TNC3 pulse from delay 142, are inputs to a NAND gate 144, the output of which resets a JK flip flop 106. Nibble count 0 occurs every other symbol, and tp2 occurs at symbol position count 2. After the end of a symbol, the Timing Chip 44 outputs an RER NOT signal which clocks JK flip flop 106. The RER NOT signal is shown at FIG. 3r. If the state of the inputs to the JK input are zero, the Q output of the JK flip flop 106 remains unchanged. Thus, during the time of two symbols comprising a byte of data with correctly written holes, the output of the flip flop 106 will remain 0. However, if either one of the two symbols between the resetting of the flip flop is incorrectly written, a 1 will be present at the inputs of the flip flop 106. This will cause the Q output to change to a 1 and remain in that state. The state of the output of the JK flip flop is shown in FIG. 3u. If the first symbol had a error, the flip flop will have a high output at the occurrence of RER NOT at symbol position 0 of the second symbol as indicated by the dashed lines in the Figure.

In either case, the output of flip flop 106 is provided to a count input of counter 108. Counter 108 is initialized to a predetermined count by inputs DET0 to DET3. The count can be varied to tolerate a certain level of errors. A clock input decrements the counter 108. At a count of 0, counter 108 outputs on the TC output an error status indicating that the error tolerance has been exceeded.

The reason that the flip flop 106 indicates the presence of an error in either of two symbols is because each symbol of a TOON code encodes 4 binary bits of data. Thus two symbols encode 8 bits of data. The preferred optical coding system operates on bytes of 8 bits.

The above apparatus was described in conjunction with a TOON code. Other codes having a null in the frequency spectrum are compatible with a prerecorded clock. One such code is a so-called 4/15 code in which there are 4 holes, two each in the even positions and two each in the odd positions. One position is left empty at the boundary. With this code, means must be provided to detect the highest signal for both the even and the odd positions, and the second highest. To do this, one merely has to have three sample and holds instead of two, as well as three comparators. One sample and hold would hold the highest value, the second would hold the next highest and the third would hold the new sample to be compared with the other two. The results of the comparison would indicate whether we had a new highest or a new second highest value. These results would be latched and fed back through to the Timing Chip, as well as to the write verify registers, one for each comparator as above. At the end of a symbol, the final state of the comparators and the sequence of triggering indicates the ones which were triggered by the finding of the highest two values. These are selected by the Timing Chip through a multiplexer. The multiplexed write verify registers of both even and odd positions can then be input to an AND gate to determine whether all recorded a simultaneous occurrence of a write pulse when they were triggered.

Apparatus for write verifying the 4/15 code is shown in FIG. 6. The figure shows a block diagram of the odd sample and holds and corresponding write verify apparatus. Identical apparatus for the even positions is not shown. The three odd sample and holds S1, S3 and S5 are shown. S1 is triggered at the first odd position, S3 the next odd and S5 at the third odd position. The outputs of the sample and holds are input to three comparators C13, C15 and C35 which compare the outputs of the corresponding sample and holds. These are latched as described above in a latch 74, now having 3 inputs and outputs, and clocked by the occurrence of an even symbol position with a signal 69 from Timing Chip 44 or an OR gate 71 as above described. The outputs of the latches are fed back to the Timing Chip 44 as before and in turn fed into bidirectional one shots 77 or transition detectors 77 which issue a pulse if a change in the latch output to which it is connected is detected. In response to the three latched feedbacks, the Timing Chip may now determine the relative magnitude of the signals in the three sample and holds and trigger the one with the lowest value at the next odd position. This sequence continues until the last odd position in which a hole may be recorded, the lowest valued sample and hold being the one next triggered.

In response to a pulse from the one-shots 77, the triggered write verify register 84 loads a delayed write pulse from delay 130. If there was a correspondence between the delayed write pulse and a change in the latched comparator the output of the write verify register 84 is now a one, else it remains a zero, as above. At the end of a symbol, the final state of the comparators C13, C15 and C35 and the sequence of triggering indicates the write verify registers 84 which were triggered by the finding of the highest two values. These are selected by the Timing Chip through a multiplexer via selects A and B. The multiplexed write verify registers of both the even and the odd positions are then input to NAND gate 105 to determine whether all selected write verify registers 84 recorded a simultaneous occurrence of a write pulse when they were triggered. If they did, correct writing has taken place. If they did not, then one of the holes either was not recorded, recorded at an incorrect location or there was a defect on the media causing a drop in reflectivity at another location.

The method of the preferred embodiment is intended to be general with respect to the class of codes having a null in the frequency spectrum at the frequency of the prerecorded clock. These codes may have any number of holes in the odd and even positions. There must be a sample and hold cell for each such hole, even and odd, plus one. The extra one is the one triggered at the next even or odd position. There are a sufficient number of comparators to determine which is the lowest, next lowest, etc. This requires that each of the sample and holds be interconnected with a comparator to each of the other sample and holds. This requires $n(n-1)/2$ comparators, where n is the number of sample and hold cells. Each comparator must be latched and fed back to the Timing Chip 44 and also fed to a transition detector which detects a change in the latched output. The transition detector issues a one shot to one of the write verify registers, which loads the delayed write pulse. Selection of the appropriate write verify registers and verification of their contents completes the write verify process.

The enumeration of the elements of the preferred embodiment are not to be taken as a limitation on the scope of the appended claims, in which we claim:

1. Apparatus for verifying the correct writing of data on an optical recording surface using differential decoding of fixed-block encoded data comprising signals read from the apparatus upon which data is recorded immediately after writing, comprising TOON counter means for counting the symbol positions within a symbol, including means for initializing said TOON counter after reaching the count of the last symbol position of the symbol;

an even pair of sample and hold cells responsive to read signals from an apparatus reading data from a medium having data recorded thereon in a fixed-block format;

an odd pair of sample and hold cells responsive to said read signals from an said apparatus reading data from said medium having data recorded thereon in a fixed-block format;

means responsive to said TOON counter means for initializing a first sample and hold cell of both said even and said odd pairs of sample and hold cells every symbol prior to the occurrence of the first symbol position in which holes may be written;

means responsive to said TOON counter means for triggering a second of said even pair of sample and hold cells at the first even symbol position of a symbol;

even comparator means for comparing the first even sample and hold cell value with the second even sample and hold cell value and for generating an even comparator output indicative of the results of the comparison;

means responsive to said TOON counter means and to said even comparator means for retaining the value in the even sample and hold cell having the higher value and for triggering the other even sample and hold cell at the next even symbol position and for repeating said retention and said triggering of the other even sample and hold cell at the occurrence of every even symbol position for which the fixed-block code may contain holes;

means responsive to said TOON counter means for triggering a second of said odd pair of sample and hold cells at the first odd symbol position of a symbol;

odd comparator means for comparing the first odd sample and hold cell value with the second odd sample and hold cell value and for generating an odd comparator output indicative of the results of the comparison;

means responsive to said TOON counter means and to said odd comparator means for retaining the value in the odd sample and hold cell having the higher value and for triggering the other odd sample and hold cell at the next odd symbol position and for repeating said retention and said triggering of the other odd sample and hold cell at the occurrence of every odd symbol position for which the fixed-block code may contain data;

means responsive to a write pulse for generating a first delayed signal indicative of the write pulse, the length of delay being a predetermined time;

means responsive to said first delayed signal for terminating the triggering of the even or odd sample and hold cell currently being triggered by any of said means responsive to said TOON counter for triggering an odd or an even sample and hold cell;

means responsive to said first delayed signal for generating a second delayed signal, the second delay being a predetermined time;

means responsive to said second delayed signal and to a change in state of said even comparator output for generating a correct even write signal in response to the simultaneous occurrence of said second delayed signal and a change in state of said even comparator output;

means responsive to said second delayed signal and to a change in state of said odd comparator output for generating a correct odd write signal in response to the simultaneous occurrence of said second delayed signal and a change in state of said odd comparator output;

means for initializing an error register to a correct write state;

means responsive to the absence of occurrence of either of said even and said odd correct write signals at the end of a symbol for changing the state of said error register to an incorrect write state.

2. The decoding apparatus of claim 1 wherein said even comparator means includes an even latch for holding the state of the even comparator means and means for triggering the even latch at every occurrence of the triggering of one of said odd sample hold cells.

3. The decoding apparatus of claim 1 wherein said odd comparator means includes an odd latch for holding the state of the odd comparator means and means for triggering the odd latch at every occurrence of the triggering of one of said even sample hold cells.

4. The write verify apparatus of claim 2 further including means for determining that the even comparator output has changed including even means for retaining the state of the output of said even latch for one symbol position and means for exclusive-ORing the output of the even latch with the retained even latch output contained in the even retaining means.

5. The write verify apparatus of claim 3 further including means for determining that the odd comparator output has changed including odd means for retaining the state of the output of said odd latch for one symbol position and means for exclusive-ORing the output of the odd latch with the retained odd latch output contained in the odd retaining means.

6. The write verify apparatus of claim 1 wherein each of said means responsive to said TOON counter for triggering an odd or an even sample and hold cell at any position of a symbol includes timing means for triggering said odd or even sample and hold cell during the second half of the symbol position.

7. The write verify apparatus of claim 1 wherein said means for initalizing said first even and odd sample and hold cells comprises means responsive to said TOON counter means for triggering a first of both said even and said odd pairs of sample and hold cells every symbol during that symbol position which is constrained to never have a hole written in it.

8. Apparatus for verifying the correct writing of data on an optical recording surface using differential decoding of fixed-block encoded data comprising signals read from the apparatus upon which data is recorded immediately after writing, comprising symbol counter means for counting the symbol positions within a symbol, including means for initializing said symbol counter after reaching the count of the last symbol position of the symbol;

n even sample and hold cells responsive to read signals from an apparatus reading data from a medium having data recorded thereon in a fixed-block format, comprising symbols having a predetermined number of positions and a predetermined number, $2(n-1)$, of holes which may be recorded in the positions, half in even positions and half in odd positions;

n odd sample and hold cells responsive to said read signals from an said apparatus reading data from said medium having data recorded thereon in a fixed-block format;

means responsive to said symbol counter means for initializing a first sample and hold cell of both said even and said odd sample and hold cells prior to the occurrence of the first symbol position in which holes may be written;

means responsive to said symbol counter means for triggering successive others of said even sample and hold cells at successive even positions beginning at the first even symbol position of a symbol, the number of cells triggered corresponding to the number, $n-1$, of holes which may be written in even positions;

$n(n-1)/2$ even comparator means for comparing each even sample and hold cell value with each of the other even sample and hold cell values;

means responsive to said symbol counter means and to said $n(n-1)/2$ even comparator means for retaining the values in the even sample and hold cells having the higher values and for triggering the even sample and hold cell having the lowest value at the next even symbol position and for repeating said retention and said triggering of the even sample and hold cell having the lowest value at the occurrence of every even symbol position for which the fixed-block code may contain holes;

means responsive to said symbol counter means for triggering successive others of said odd sample and hold cells at successive odd positions beginning at the first odd symbol position of a symbol, the number of cells triggered corresponding to the number, $n-1$, of holes which may be written in odd positions;

$n(n-1)/2$ odd comparator means for comparing each odd sample and hold cell value with each of the other odd sample and hold cell values;

means responsive to said symbol counter means and to said $n(n-1)/2$ odd comparator means for retaining the values in the odd sample and hold cells having the higher values and for triggering the odd sample and hold cell having the lowest value at the next odd symbol position and for repeating said retention and said triggering of the odd sample and hold cell having the lowest value at the occurrence of every odd symbol position for which the fixed-block code may contain holes;

means responsive to a write pulse for generating a delayed signal indicative of the write pulse, the length of delay being a predetermined time;

means responsive to said delayed signal for terminating the triggering of the even or odd sample and hold cell currently being triggered by any of said means responsive to said symbol counter for triggering an odd or an even sample and hold cell;

$n(n-1)/2$ even write verify register means, each responsive to said delayed signal and to one of said $n(n-1)/2$ even comparator means, for generating a correct even write signal in response to the simultaneous occurrence of said second delayed signal and an indication from the even comparator means of the detection of a newer higher value in one of the two sample and holds to which it is connected;

$n(n-1)/2$ odd write verify register means, each responsive to said delayed signal and to one of said $n(n-1)/2$ odd comparator means, for generating a correct odd write signal in response to the simultaneous occurrence of said second delayed signal and an indication from the odd comparator means of the detection of a newer higher value in one of the two sample and holds to which it is connected.

9. The decoding apparatus of claim 8 further including even multiplexer means, responsive to said even comparator means, for determining which of said even write verify register means was triggered in response to the detection of one of the $n-1$ highest values and for placing the on outputs the state of the selected registers;

odd multiplexer means, responsive to said odd comparator means, for determining which of said odd write verify register means was triggered in response to the detection of one of the $n-1$ highest values and for placing the on outputs the state of the selected registers;

means responsive to said even and odd multiplexer means for determining whether all of said selected register states indicate the simultaneous occurrence of a write pulse.

10. The decoding apparatus of claim 8 wherein said even comparator means includes even latch means for holding the state of even comparator means and further including means for triggering the each of said even latch means at every occurrence of the triggering of one of said odd sample hold cells.

11. The decoding apparatus of claim 8 wherein said odd comparator means includes odd latch means for holding the state of the odd comparator means and further including means for triggering each of said odd latch means at every occurrence of the triggering of one of said even sample hold cells.

12. The write verify apparatus of claim 10 further including means connected to each of said even latch means for determining that the state of the even latch means has changed including means for retaining the state of said even latch means for one symbol position and means for exclusive-ORing the state of the even latch means with the retained state of said even latch means contained in the even retaining means.

13. The write verify apparatus of claim 10 further including means connected to each of said odd latch means for determining that the state of the odd latch means has changed including means for retaining the state of said odd latch means for one symbol position and means for exclusive-ORing the state of the odd latch means with the retained state of said odd latch means contained in the odd retaining means.

14. The write verify apparatus of claim 8 wherein each of said means responsive to said symbol counter means for triggering an odd or an even sample and hold cell includes timing means for triggering said odd or even sample and hold cell during the second half of the symbol position.

15. The write verify apparatus of claim 8 wherein said means for initalizing said first even and odd sample and hold cells comprises means responsive to said symbol counter means for triggering a first of both said n even and said n odd sample and hold cells during that symbol position which is constrained to never have a hole written in it.

* * * * *